(12) United States Patent
Fujimoto (10) Patent No.: US 7,810,110 B2
(45) Date of Patent: Oct. 5, 2010

(54) DISC CHANGER WITH SUPPORT FOR SWING ARM IN DISC REPRODUCING POSITION

(75) Inventor: Fumihiko Fujimoto, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 954 days.

(21) Appl. No.: 11/338,064

(22) Filed: Jan. 24, 2006

(65) Prior Publication Data

US 2006/0168602 A1 Jul. 27, 2006

(30) Foreign Application Priority Data

Jan. 24, 2005 (JP) ............................... 2005-015913
Dec. 27, 2005 (JP) ............................... 2005-375778

(51) Int. Cl.
*G11B 17/03* (2006.01)
(52) U.S. Cl. ...................................... 720/614
(58) Field of Classification Search ................. 720/614, 720/690, 645
See application file for complete search history.

(56) References Cited

U.S. PATENT DOCUMENTS

| | | | |
|---|---|---|---|
| 5,138,591 A * | 8/1992 | Ogawa et al. ............. | 369/30.83 |
| 5,682,364 A * | 10/1997 | Ogawa .................... | 369/30.81 |
| 5,917,787 A * | 6/1999 | Tsuchiya et al. .......... | 369/30.81 |
| 6,198,716 B1 * | 3/2001 | Tamiya et al. ............ | 369/30.78 |
| 6,222,816 B1 | 4/2001 | Yoshida et al. | |
| 6,459,674 B1 * | 10/2002 | Matsumoto et al. ......... | 720/611 |
| 6,650,603 B2 | 11/2003 | Michimori et al. | |
| 6,990,675 B2 * | 1/2006 | Suzuki et al. ............... | 720/672 |
| 7,093,269 B2 * | 8/2006 | Murotani .................... | 720/605 |
| 7,418,724 B2 * | 8/2008 | Tatekawa et al. ............ | 720/673 |

FOREIGN PATENT DOCUMENTS

| | | |
|---|---|---|
| CN | 1173019 | 2/1998 |
| CN | 1174376 | 2/1998 |
| CN | 1244016 | 2/2000 |
| JP | 11353769 | 12/1999 |
| JP | 2001-167499 | 6/2001 |
| JP | 2002109813 | 4/2002 |
| WO | 03036636 | 5/2003 |

* cited by examiner

*Primary Examiner*—David D Davis
(74) *Attorney, Agent, or Firm*—Fogg & Powers LLC (57) ABSTRACT

A disc changer having a swing arm as a reproducing device in a disc drive unit can prevent an arm front end from being fluctuated when the swing arm reproduces the content of a disc or when a disc is mounted. The disc changer takes out a desired one disc from a stocker using the swing arm, and reproduces the information with an optical head. The disc changer has a holding projection that holds the bottom surface of the front end of the swing arm at a disc take-out position. The disc changer also has an auxiliary arm that supports a part of the swing arm near the front end of the swing arm when the swing arm is rotated to the disc reproduction position.

3 Claims, 8 Drawing Sheets

DISC CHANGER WITH SUPPORT FOR SWING ARM IN DISC REPRODUCING POSITION

CROSS-REFERENCE TO RELATED APPLICATION

This application claims priority from, an incorporates by reference the entire disclosure of, Japanese Patent Applications No. 2005-15913, filed on Jan. 24, 2005 and No. 2005-375778, filed on Dec. 27, 2005.

BACKGROUND OF THE INVENTION

1. Field of the Invention

The present invention relates to a disc changer. Particularly, the invention relates to a disc changer incorporated in a disc drive unit, the disc changer having a disc reproducing device that reproduces the content of a disc taken out from a disc accommodation section, using a rotating swing arm.

2. Description of the Related Art

Conventionally, a cassette tape has been the mainstream medium recorded with music to provide music in a motor vehicle. However, a disc medium such as a compact disc (CD) and a mini disc (MD) is now mainly used in place of the cassette tape. Because the disc is thinner than the cassette tape, and particularly because an optical disc like the CD is not in a case, a disc changer that accommodates plural discs in a reproducing device and reproduces the recorded content by changing the discs is popular. A disc changer is also being developed for a digital versatile disc (DVD) type of optical disc.

This disc changer of optical discs has a disc accommodation section capable of separately accommodating plural discs, one by one, inside a casing. A rotating swing arm takes out a desired one of the discs from this disc accommodation section, and reproduces the content of the disc using an optical head. When the reproduction ends, the swing arm returns the disc to the disc accommodation section. In general, a turntable on which a disc is rotated and a clamper that fixes the disc onto the turntable are provided at the front end of the swing arm. An optical head moves in a radial direction of the optical disk, on a moving path formed on the swing arm, on the disc that rotates on the turntable, thereby reproducing the information recorded on the disc. Generally, the disc changer has the disc accommodation section movably arranged, in the up and down directions, to facilitate the taking out of a desired one disc from the disc accommodation section.

However, the rotating swing arm has a rotation axis at only one end of the swing arm. Therefore, when this swing arm is used for the reproducing device of the disc exchanger, the front end of the swing arm is fluctuated due to the oscillation of a turntable that rotates during the reproduction of a disc. Consequently, this has a risk that the data recorded on the disc is read inaccurately. To solve this problem, there is a method of pressing the front end of the swing arm with a spring. However, the front end of the swing arm is easily fluctuated due to a loosening of members that constitute the swing arm, and the fluctuation of the front end of the swing arm cannot be solved completely.

When a disc of which content is to be reproduced is mounted on and fixed to the rotating swing arm used for the reproducing device of the disc changer, the swing arm is rotated to a position of the center hole of the disc held in the disc accommodation section. The disc accommodated in the accommodation section immediately above this position is placed on the turntable and is fixed to the turntable. In this case, when the front end of the swing arm is distorted, the disc is not accurately fixed to the front end of the swing arm.

SUMMARY OF THE INVENTION

In order to solve the above conventional problems of the disc changer, it is an object of the present invention to provide a disc changer having a disc reproducing device that prevents the front end of a swing arm of the disc changer from being fluctuated in a disc drive unit, at the time of mounting a disc on the swing arm or at the time of reproducing the content recorded on the disc.

In order to achieve the above object, protection devices of disc changers according to the following three aspects of the invention are possible.

According to a first aspect of the invention, there is provided a disc changer for a disc drive unit, having a disc accommodation section that accommodates plural discs, the disc changer including: a swing arm that has a turntable for rotating a disc, and that can swing; and an auxiliary arm that supports the swing arm by being engaged with the swing arm, when the swing arm is swung to a position at which the content of the disc is to be reproduced.

Preferably, the auxiliary arm is movable, and is driven linked to the swing of the swing arm.

Preferably, the auxiliary arm is rotated when the swing arm returns to the disc content reproduction position by clamping a disc on the turntable, and is engaged with the swing arm in a direction to interrupt the swing operation of the swing arm.

Preferably, a pulley engagement projection having a V-shaped groove is provided on the lower surface of the swing arm, and an engagement recess that is engaged with the V-shaped groove of the engagement projection is provided at the front end of the auxiliary arm.

In the above case, a holding projection can be provided on the bottom surface of the casing of the disc changer, and the holding projection passes through a center hole of discs when the disc accommodation section that accommodates the discs is moved down to near the bottom surface of the casing, and holds the bottom surface of the swing arm when the swing arm comes to a position where the swing arm takes out one of the discs accommodated in the disc accommodation section.

Further, in the above case, a drive unit of the swing arm can include: a swing arm drive plate that is driven by a motor and rotates the swing arm; a relay plate to be connected to the swing arm drive plate; and an auxiliary arm drive plate that operates the auxiliary arm in response to the operation of the relay plate. When the swing arm is rotated to the disc content reproduction position after the swing arm has clamped a disc, the drive plate of the auxiliary plate can be operated to make the auxiliary arm support a part of the swing arm near the front end of the swing arm.

According to a second aspect of the invention, there is provided a disc changer for a disc drive unit, including a disc accommodation section that accommodates plural discs and can be lifted up and moved down within the disc drive unit, and a disc reproducing device that takes out one of the discs accommodated in the disc accommodation section and reproduces the content of the disc. The disc reproducing device includes: a swing arm having a turntable of which one end is rotatably supported within a casing of the disc changer, with a disc clamped and rotated at the other end, and an optical head that reads information recorded on the disc, at the center; a rotation drive unit that drives the swing arm; and a holding projection that is provided on the bottom surface of the casing of the disc changer, that passes through the center hole of discs when the disc accommodation section accommodating the discs is moved down near to the bottom surface of the casing, and holds the bottom surface of the swing arm when the swing arm comes to a position where the swing arm takes out one of the discs accommodated in the disc accommodation section.

In the disc changer for a disc drive unit according to the above aspect of the invention, a sloped surface for smoothly guiding the bottom surface of the swing arm to the top surface of the holding projection and a positioning projection that determines a position at which the swing arm mounts the disc can be provided on the top surface of the holding projection.

According to a third aspect of the invention, there is provided a disc changer for a disc drive unit, including a disc accommodation section that accommodates plural discs and can be lifted up and moved down within the disc drive unit, and a disc reproducing device that takes out one of the discs accommodated in the disc accommodation section and reproduces the content of the disc. The disc reproducing device includes: a swing arm that has a turntable for rotating a disc, and an optical head that reads information recorded on the disc; and an auxiliary arm that supports the swing arm, when the swing arm is rotated to the position of reproducing the content of the disc.

According to the disc changer of the present invention, the swing exchanges a disc within the disc changer, and reproduces the content of the disc. When the disc changer reproduces the content of the disc or mounts the disc on the turntable from the disc accommodation section, the front end of the swing arm is not fluctuated. Therefore, the data recorded on the disc can be read accurately, and the disc can be correctly clamped on the turntable at the time of taking out the disc.

BRIEF DESCRIPTION OF THE DRAWINGS

The present invention is illustrated by way of example and not limitation in the figure of the accompanying drawings in which like references indicate similar elements. Note that the following figures are not necessarily drawn to scale.

DESCRIPTION OF THE PREFERRED EMBODIMENTS

Disc changers according to embodiments of the present invention are explained in detail below with reference to the accompanying drawings.

Figure 1:
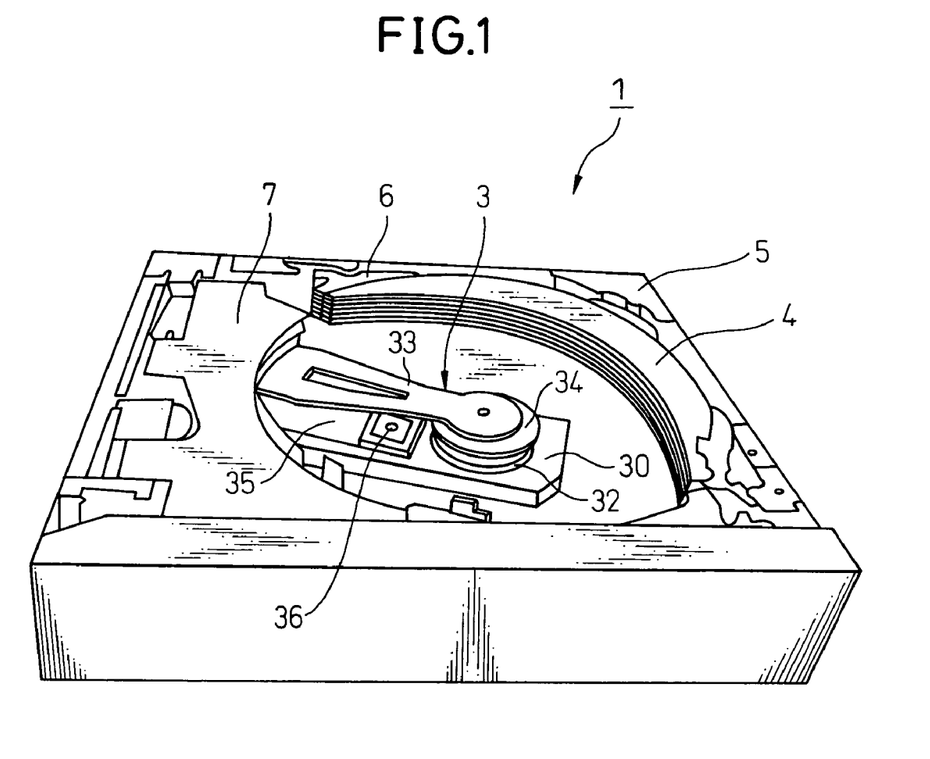
FIG. 1 is a perspective view of a configuration of a disc changer to which the present invention is applied.

FIG. 1 is a perspective view of a configuration of a disc changer 1 to which the present invention is applied, where a disc is not accommodated. The disc changer 1 to which the present invention is applied includes a stocker 4 as a disc accommodation section capable of accommodating plural discs and capable of being lifted up and moved down within the disc changer, a swing arm 3 that takes out a disc from the stocker 4, reproduces content of the disc, and returns the disc to the stocker 4 after the reproduction, a drive unit 7 of the swing arm 3, a linear position sensor (not shown) that detects a position of the stocker 4, and a lift mechanism 5 that lifts up and moves down the stocker 4 based on an output of the linear position sensor.

The swing arm 3 is rotated by the drive unit 7, and broadly includes a frame 30 and a clamp arm 33. A turntable 32 on which a disc is rotated is provided at the front end of the frame 30. An optical head 36 and a moving path 35 on which the optical head 36 moves are provided at the center of the frame 30. A base of the clamp arm 33 is fitted to the upper part of the frame 30 with a rotating axis. A clamper 34 that clamps a disc is rotatably provided at the front end of the clamp arm 33. The front end of the clamp arm 33 rotates to the frame 30 side, and sandwiches and fixes a disc mounted onto the turntable 32 with the clamper 34.

A position of the swing arm 3 in a vertical direction within the disc changer 1 is unchanged, and is constant. Therefore, in order to enable the swing arm 3 to clamp a desired one of the discs accommodated in the stocker 4, the stocker 4 is divided in a vertical direction and moves within the disc changer 1. The stocker 4 has one stocker base, and plural movable stockers as movable racks mounted on the stocker base. Each movable stocker can accommodate one disc. The stocker 4 moves up and down within the disc changer 1 based on the operation of the stocker lift mechanism 5. In order to enable the swing arm 3 to take out a desired one of discs held in the stocker 4, the movable stockers constituting the stocker 4 can be divided into up and down portions at a desired position by a stocker dividing mechanism 6.

FIG. 2A to FIG. 3J are explanatory diagrams for explaining the operation of the swing arm drive system 7 and the swing arm 3 in the disc changer 1, together with the operation of the stocker diving mechanism 6 and the lift mechanism 7. In other words, FIG. 2A to FIG. 3J show the operation that the swing arm 3 takes out one disc from the stocker 4, the operation that the swing arm reproduces the content of the disc, and the operation that the swing arm returns the disc to the stocker 4 after reproducing the content of the disc. FIG. 2A to FIG. 2E are top plan views of the disc changer in operation, and FIG. 3A to FIG. 3J are side views of the disc changer in operation.

Figure 2A:
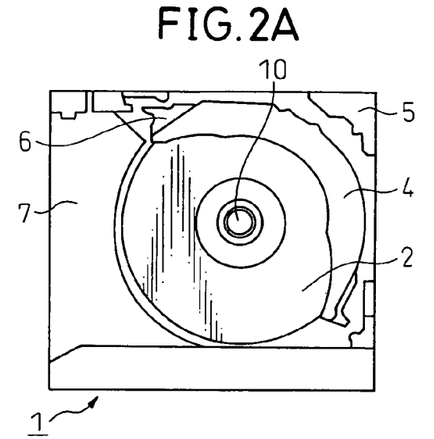
FIG. 2A to FIG. 2E are top plan views of a swing arm of the disc changer in operation.

First, positions of the disc 2, the swing arm 3, and the stocker 4 in the disc changer 1 are explained with reference to FIG. 2A to FIG. 2E. FIG. 2A shows a waiting state of the disc changer 1 when the disc changer 1 is not operating, or a state that the power supply to the disc changer 1 is disconnected. In this state, plural discs 2 are accommodated in the stocker 4. The swing arm 3 is accommodated in the swing arm drive system 7, and is not shown in FIG. 2A. In this case, the discs within the stocker 4 can be freely lifted up and moved down with the stocker lift mechanism 5 in the disc changer 1.

A holding projection 10 is provided at a position that matches the center hole of the discs 2 accommodated in the stocker 4, on the bottom surface of the casing of the disc changer 1. The holding projection 10 is passed through the center hole of the discs 2 when the stocker 4 is moved down by the stocker lift mechanism 5 within the disc drive unit, thereby preventing the discs 2 from being skipped out from the stocker 4.

The operation of taking out the top disc 2 from among the discs 2 accommodated in the stocker 4, and returning the disc 2 to the stocker 4 after reproducing the content of the disc 2 is explained with reference to FIG. 2B to FIG. 2E. In order to reproduce the content of the top disc 2 out of the discs 2 accommodated in the stocker 4, the stocker lift mechanism 5 moves down the stocker 4 in the state shown in FIG. 2A. The top disc 2 is brought to a position at which this disc 2 is taken out with the swing arm 3. While the details are described later, the movable stockers in the stocker 4 are divided into upper and lower parts in this state. Only the movable stocker 4 that accommodates the disc 2 of which content is to be reproduced is left, and other movable stockers in the stocker 4 fall further.

Figure 2B:
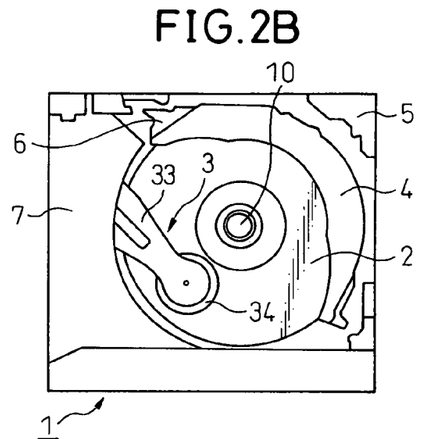

When the fall of the other movable stockers 4 in the stocker 4 and the isolation of the movable stocker 4 accommodating the reproduction disc 2 are completed, the swing arm drive system 7 drives the swing arm 3 to rotate the swing arm 3 toward the center hole of the disc 2 within the disc changer, as shown in FIG. 2B. In FIG. 2B, only the clamp arm 33 located above the swing arm 3, and the clamper 34 are shown. Because the frame of the swing arm 3 is located below the disc 2, the frame is not shown in FIG. 2B. The not shown frame moves between the reproduction disc 2 and other discs 2 that are divided and located below this reproduction disc 2.

Figure 2C:
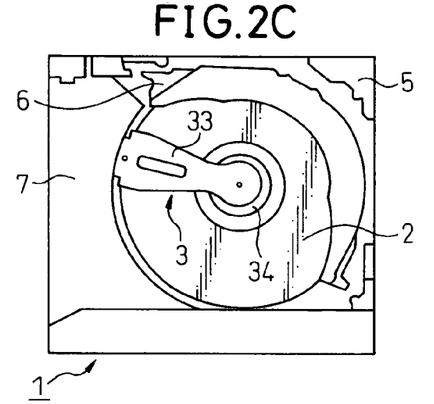

As shown in FIG. 2C, the swing arm 3 stops the rotation above the center hole of the disc 2. In this state, the swing arm 3 is fixed to the top of the holding projection 10 shown in FIG. 2A and FIG. 2B, and this operation is described later. When the swing arm 3 is fixed to the top of the holding projection 10, only the stocker 4 that accommodates the reproduction disc 2 falls, and the disc 2 held in this stocker 4 is mounted on the turntable of the swing arm 3. When the reproduction disc 2 is mounted on the turntable, the clamp arm 33 of the swing arm 3 rotates to the turntable, and the clamper 34 clamps the reproduction disc 2 and fixes it onto the turntable.

Figure 2D:
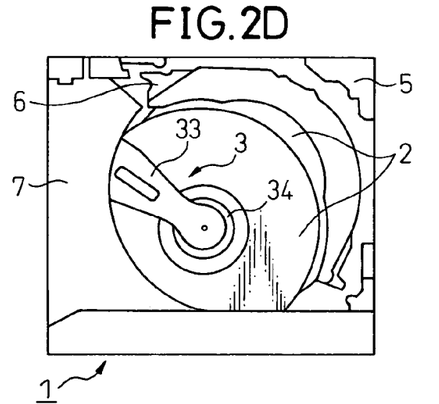
Figure 2E:
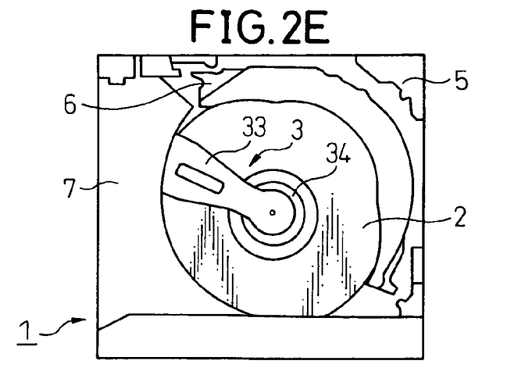

When the clamper 34 fixes the reproduction disc 2 onto the turntable, the swing arm 3 rotates to the reproduction position of the disc 2, and reproduces the content of the disc 2 at this position, as shown in FIG. 2D. The front end of the swing arm 3 is fixed by an auxiliary arm not shown. The operation of the auxiliary arm is described later. When the reproduction of the content of the disc 2 ends, the swing arm 3 rotates again toward the center hole of the disc 2 held in the movable stocker 4, and accommodates the disc 2 of which content has been reproduced into the stocker 4, as shown in FIG. 2E. FIG. 2E shows a state that a part of the disc 2 of which content has been reproduced is inserted into the stocker 4, and not a state that the disc 2 is completely returned to the stocker 4.

When the disc 2 of which content has been reproduced is completely accommodated in the stocker 4, the state as shown in FIG. 2C is obtained. Thereafter, the swing arm 3 rotates and returns to the drive unit 7 of the swing arm 3, and reaches the state as shown in FIG. 2A. In this state, the stocker 4 moves in an up or down direction to bring the next disc 2, of which the content is to be reproduced, to a position of the swing arm 3, and repeats the same reproduction of this disc 2. The disc 2 accommodated in the stocker 4 can be changed with other disc located at the outside of the disc changer, but the change of the disc 2 is not explained here.

Figure 3A:
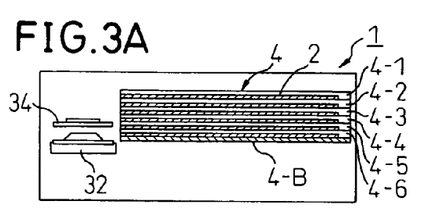
FIG. 3A is a side view of the swing arm of the disc changer in a disc select operation.

The above operation of taking out the disc 2 from the stocker 4, reproducing the content of the disc 2, and returning the disc 2 to the stocker 4 as observed from the side surface of the disc changer 1 is explained in further detail with reference to FIG. 3A to FIG. 3J. In order to make clear the dividing operation of the stocker 4, a state of reproducing the content of a disc 2-3 located at a third position from the top of the discs 2 stored in the stocker 4 is explained. As shown in FIG. 3A, six movable stockers 4-1 to 4-6 are mounted on a stocker base 4-B of the stocker 4. Each of the movable stockers 4-1 to 4-6 can be moved independently. Each of the movable stockers 4-1 to 4-6 can accommodate one disc 2. The six discs 2 are identified as a disc 2-1 to a disc 2-6 from the top, as shown in FIG. 3B.

FIG. 3A shows the same state as that of FIG. 2A, and shows a state before the disc 2 is reproduced. FIG. 3A shows only the turntable 32 and the clamper 34 of the swing arm 3, and omits the other constituent members of the swing arm 3. In the state as shown in FIG. 3A, the turntable 32 and the clamper 34 are sheltered from the moving range of the discs 2. The discs 2 in the stocker 4 can be moved to up and down portions of the disc changer 1. In other words, FIG. 3A shows a state before selecting a disc of which content is to be reproduced.

Figure 3B:
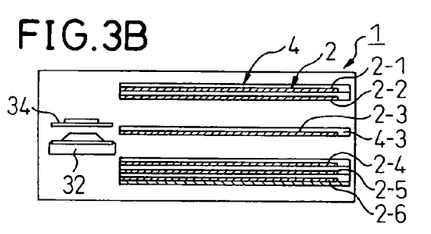
FIG. 3B is a side view of the swing arm of the disc changer in a stocker divide operation.

FIG. 3B shows a state that the disc 2 of which content is to be reproduced is selected, and the stocker 4 is divided into parts. Specifically, in FIG. 3B, the disc 2-3 in a third movable stocker 4-3 form the top is selected, and the stocker 4 is divided into three parts. In this state, a space into which the turntable 32 can be inserted is formed below the selected disc 2-3, and a space into which the clamper 34 can be inserted is formed above the disc 2-3. The state shown in FIG. 3B is the same as the state shown in FIG. 2A. The dividing mechanism of the stocker 4 is not explained here.

Figure 3C:
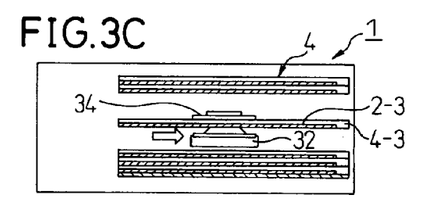
FIG. 3C is a side view of the swing arm of the disc changer in a drive insert operation.
Figure 3D:
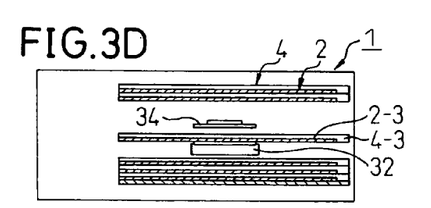
FIG. 3D is a side view of the swing arm of the disc changer in a disc mount operation.

FIG. 3C shows a state where the turntable 32 and the clamper 34 that constitute a disc drive are inserted into the upper space and the lower space respectively formed in the state shown in FIG. 3B. FIG. 3C corresponds to the state shown in FIG. 2B and FIG. 2C. The insertion of the turntable 32 and the clamper 34 ends at the position of the center hole of the disc 2-3. Thereafter, as shown in FIG. 3D, the third movable stocker 4-3 from the top falls, and the disc 2-3 held in the movable stocker 4-3 is mounted on the turntable 32. At this time, the turntable 32 is fixed to the top of the holding projection.

Figure 3E:
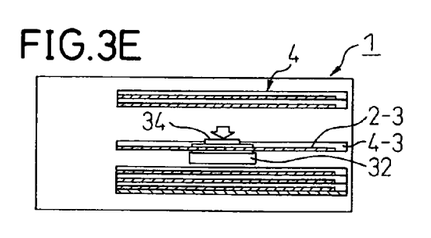
FIG. 3E is a side view of the swing arm of the disc changer in a clamp operation.
Figure 3F:
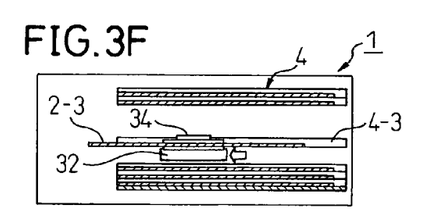
FIG. 3F is a side view of the swing arm of the disc changer in a disc draw operation.
Figure 3G:
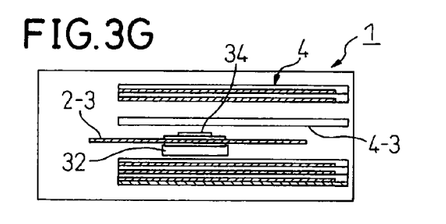
FIG. 3G is a side view of the swing arm of the disc changer in a stopper lift up operation.

When the disc 2-3 is mounted on the turntable 32, the clamper 34 clamps the disc 2-3 as shown in FIG. 3E. Then, as shown in FIG. 3F, the disc 2-3 is extracted from the stocker 4-3 based on the move of the turntable 32. Because the stocker 4-3 is crescent-shaped as shown in FIG. 1 and FIG. 2A to FIG. 2E, when the turntable 32 moves to the reproduction position to some extent, the turntable 32 is not engaged with the disc 2-3. In this state, the stocker 4-3 having no disc moves up as shown in FIG. 3G.

Figure 3H:
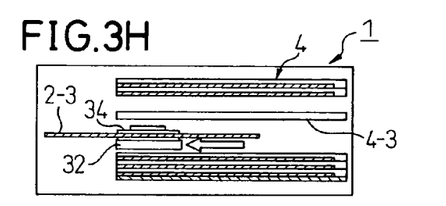
FIG. 3H is a side view of the swing arm of the disc changer in a reproduce operation.
Figure 3I:
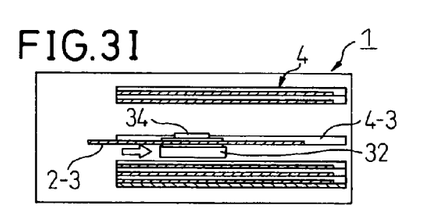
FIG. 3I is a side view of the swig arm of the disc changer in a disc accommodate operation.

Thereafter, the turntable 32 further continues to rotate to a direction of extracting the disc 2-3, and stops at the reproduction position as shown in FIG. 3H. This state corresponds to the state shown in FIG. 2D, and the content of the disc 2-3 is reproduced at this position. At this time, the turntable 32 is fixed by the auxiliary arm described later. After the reproduction of the content, the turntable 32 moves to the stocker 4, and accommodates the disc 2-3 in the original movable stocker 4-3, as shown in FIG. 3I. The state of FIG. 3I corresponds to the state shown in FIG. 2E. At this time, the movable stocker 4-3 is already down at the position of accommodating the disc 2-3.

Figure 3J:
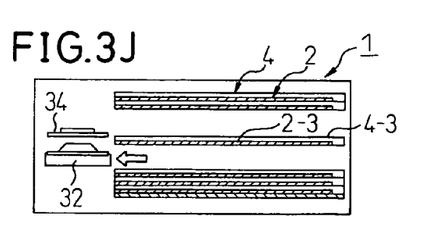
FIG. 3J is a side view of the swing arm of the disc changer in a drive recede operation.

When the disc 2-3 is accommodated in the movable stocker 4-3, the clamper 34 rises, and the disc 2-3 becomes free on the turntable 32. Therefore, the turntable 32 and the clamper 34 constituting the disc drive go back to a position where the turntable 32 and the clamper 34 do not interfere with the disc held on the stocker 4, thereby ending the reproduction of the content of the disc 2-3, as shown in FIG. 3J. Thereafter, the movable stocker 4-3 rises to the position as shown in FIG. 3C. When a reproduction of the content of the disc 2 is to be further continued, the dividing position of the stocker 4 shown in FIG. 3B changes, and the operation similar to that shown in FIG. 3B to FIG. 3J is repeated.

Figure 4A:
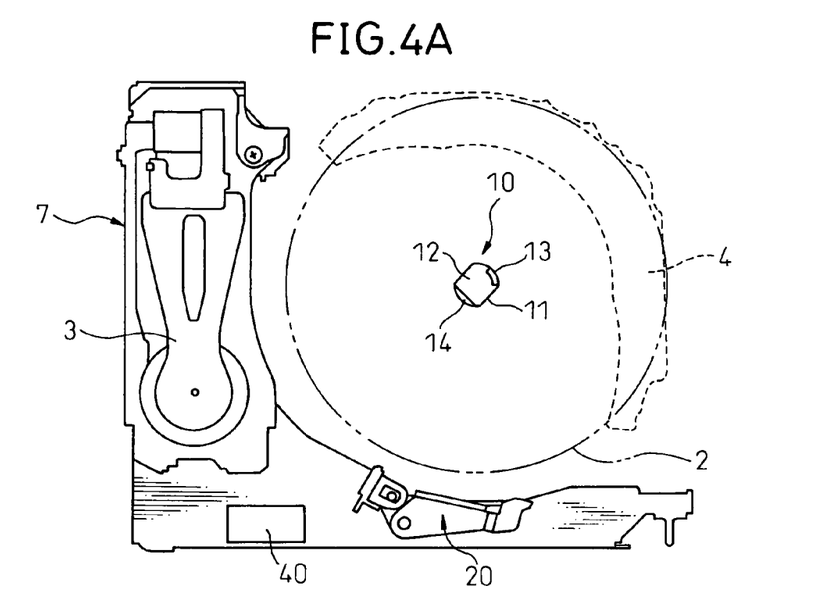
FIG. 4A is a top plan view of a disc, a disc accommodation section, and a holding projection showing their positional relationship when the swing arm is not operating.

The operation of the reproducing device of the disc changer 1 that carries out the above operation is explained in further detail. FIG. 4A is a top plan view of the disc 2 (indicated by a chain double-dashed line), the stocker 4 (indicated by a broken line) as the disc accommodation section, and the holding projection 10, showing their positional relationship when the swing arm 3 constituting the reproducing device of the present invention is not operating. In this state, the swing arm 3 is in the swing arm drive device 7, and does not interrupt the lifting up and moving down of the disc 2 accommodated in the stocker 4, within the disc changer 1. The position of the auxiliary arm 20 and the position of a motor 40 as the drive source of the swing arm drive system 7 are shown in FIG. 4A.

Figure 5A:
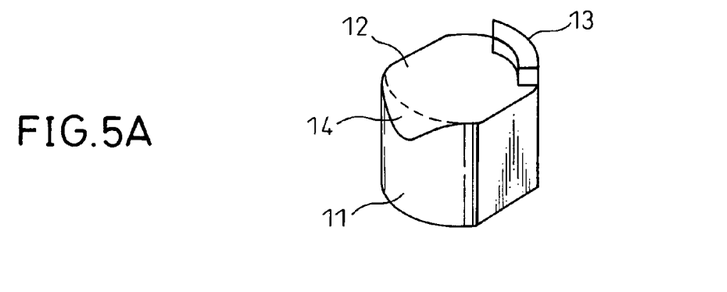
FIG. 5A is a perspective view of the holding projection.

As described above, the holding projection 10 is provided on the bottom surface of the casing of the disc changer 1 at the position that matches the center hole of the discs 2 accommodated in the stocker 4. In the present embodiment, the holding projection 10 has a shape that the side surface of a cylindrical main body 11 is cut in parallel, as shown in FIG. 5A. A circular stopper 13 is provided in projection on a top surface 12 of the cylindrical main body 11. The stopper 13 is used to fix the position of the swing arm 3 on the top surface 12 when the swing arm 3 is rotated and mounted on the top surface 12. A sloped surface 14 is formed on the side surface of the cylindrical main body 11 where the swing arm 3 approaches, so that the bottom surface of the swing arm 3 is smoothly guided to the top surface 12.

Figure 4B:
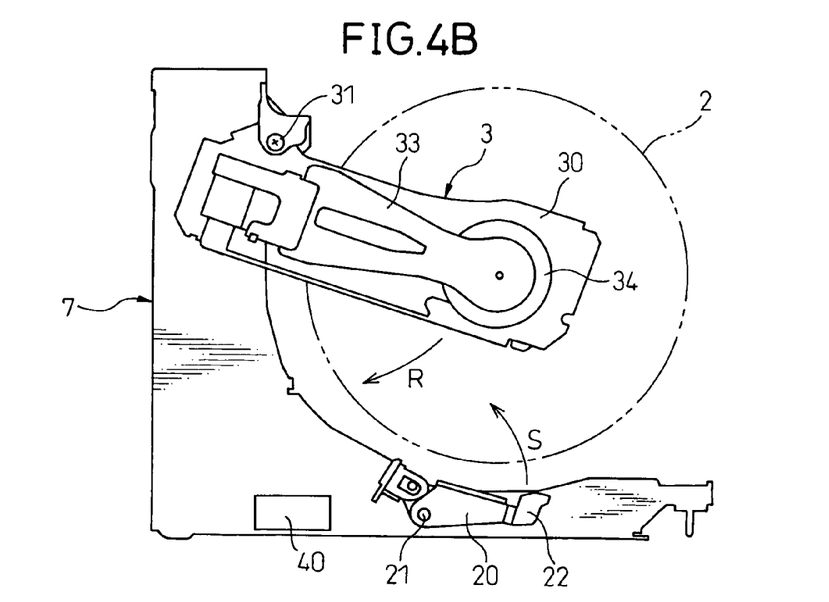
FIG. 4B is a top plan view of the swing arm of the disc changer showing a state that the swing arm has come to a position of taking out a disc.

FIG. 4B is a top plan view of the swing arm 3 of the disc changer showing a state that the swing arm 3 has come to a position of taking out a disc after rotating from the position shown in FIG. 4A. In FIG. 4B, a reference symbol 30 denotes a frame of the swing arm 3, a reference symbol 31 denotes a rotation axis of the swing arm 3, a reference symbol 33 denotes a clamp arm, and a reference symbol 34 denotes a clamper. When the swing arm 3 has come to the disc take-out position, the bottom surface of the swing arm 3 is mounted on the top surface 12 of the holding projection 10 as shown in detail in FIG. 5B.

Figure 5B:
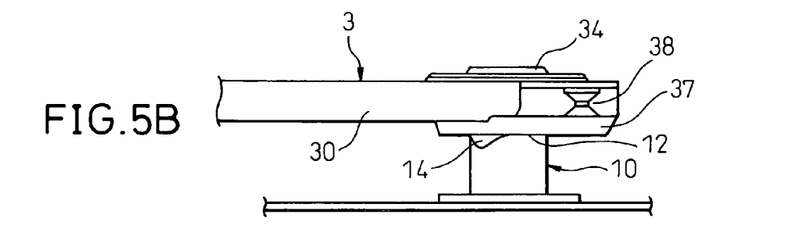
FIG. 5B is a side view of a key element of the disc changer showing a state that a front end of the swing arm is held by the holding projection.
Figure 5C:
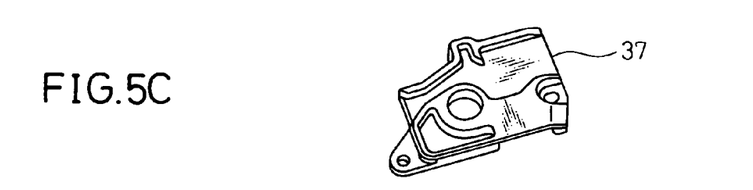
FIG. 5C is a perspective view of an engagement member that is fitted to the bottom surface of the front end of the swing arm.
Figure 5D:
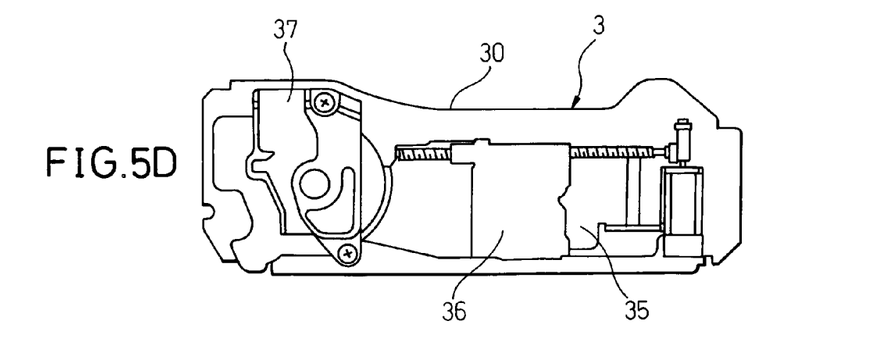
FIG. 5D is a bottom plan view of the swing arm to the front end of which the engagement member is fitted.

An attachment 37, as shown in FIG. 5C, is fitted to the bottom surface of the frame 30 of the swing arm 3 near the front end of the frame 30, as shown in FIG. 5D so that the bottom surface of the swing arm 3 can be mounted on the top surface 10 without a gap when the swing arm has come to the position of taking out a disc. The reference numeral 36 denotes the optical head that moves along the moving path 35, observed from the back surface of the optical head.

As explained above, according to the disc reproducing device of the present invention, when the swing arm 3 has come to the position of taking out the disc 2 from the stocker 4 as the disc accommodation section, the bottom surface of the swing arm 3 is held in the state of being positioned on the holding projection 10 provided on the bottom surface of the casing of the disc changer 1. Therefore, the disc 2 is mounted from the stocker 4 on the correct position of the turntable 32 of the swing arm 3. Further, because the turntable 32 is not fluctuated when the disc 2 is mounted on the turntable 32, the disc 2 can be mounted correctly on the turntable 32.

The operation carried out by the disc reproducing device at the time of reproducing the content of the disc is explained next. When the clamper 34 has clamped the disc 2 mounted on the turntable 32 of the swing arm 3, the swing arm 3 is rotated in the direction of an arrowhead R, and proceeds to the disc reproduction position, as explained with reference to FIG. 4B. Then, in synchronism with the rotation of the swing arm 3 in the direction of the arrowhead R, the drive system 7 also rotates the hidden auxiliary arm 20 accommodated in the swing arm drive system 7, in the direction of an arrowhead S around a rotation axis 21. A front 22 end of the auxiliary arm 20 first enters a moving track of the front end of the swing arm 3. The operation mechanism of the swing arm 3 and the auxiliary arm 20 of the drive system is explained later.

Figure 6A:
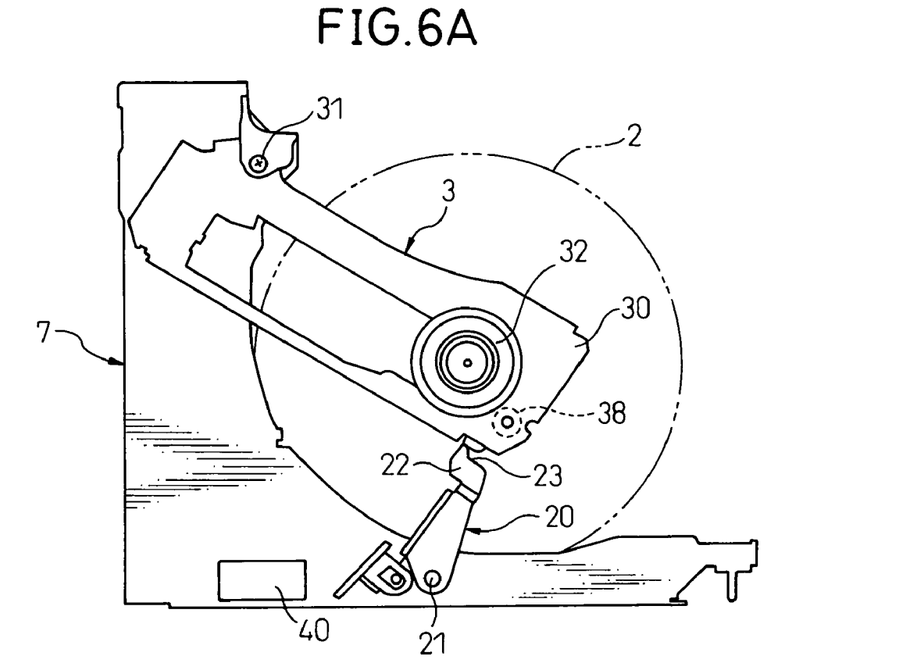
FIG. 6A is a top plan view of the swing arm of the disc changer showing a state that the swing arm that has clamped a disc is moving to a content reproduction position.
Figure 7:
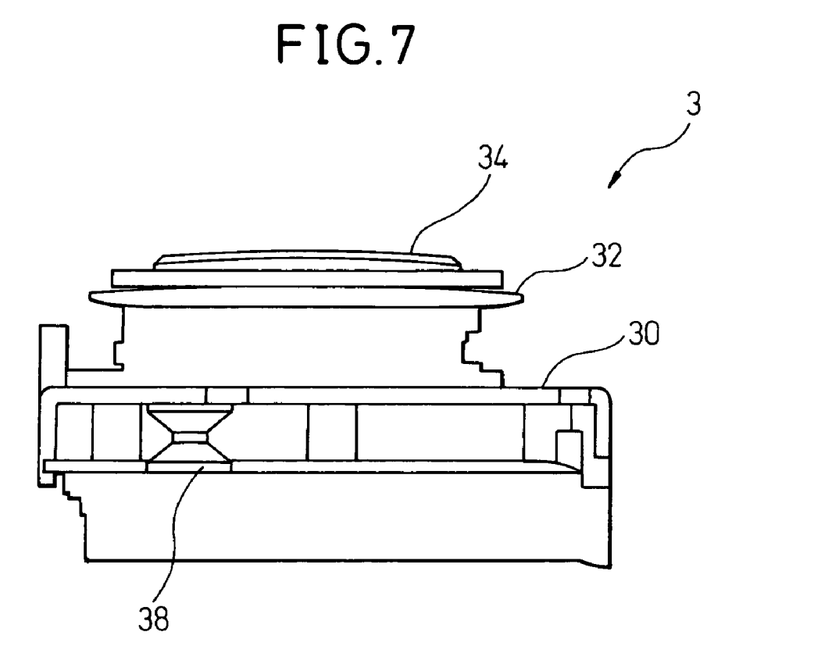
FIG. 7 is a front view of an engagement part where the swing arm is engaged with the auxiliary arm.

More specifically, a pulley holding member 38 having a V-shaped groove as shown in FIG. 5B and FIG. 7 is fitted to the front end of the frame 30 of the swing arm 3, in a direction perpendicular to the frame 30. On the other hand, a latch supporting member 23 that is engaged with the holding member 38 is formed on the front end 22 of the auxiliary arm 20. The latch supporting member 23 is engaged with the center of the V-shaped groove of the holding member 38. When the swing arm 3 starts rotation in the direction of the arrowhead R, the auxiliary arm 20 also starts rotation in the direction of the arrowhead S. However, the rotation of the auxiliary arm 20 is faster than that of the swing arm 3. Consequently, the latch supporting member 23 at the front end 22 of the auxiliary arm 20 first enters the moving track of the holding member 38 at the front end of the swing arm 3, and waits for the arrival of the holding member 38, as shown in FIG. 6A.

Figure 6B:
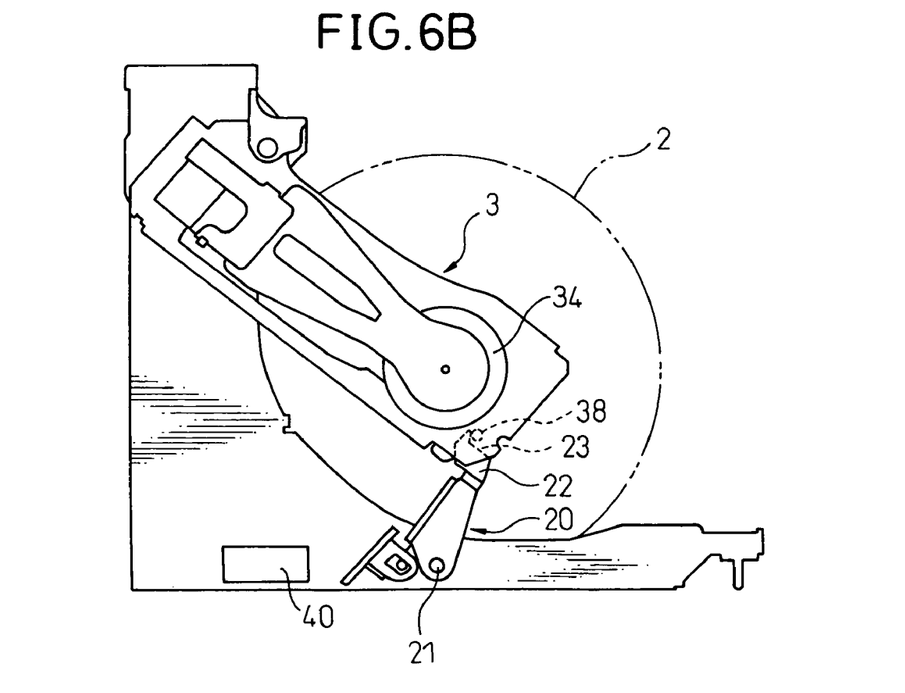
FIG. 6B is a top plan view of the swing arm of the disc changer showing a state that the swing arm that has clamped the disc has come to the content reproduction position.

As a result, as shown in FIG. 6B when the swing arm 3 has come to the position of reproducing the content of the disc 2, the latch supporting member 23 at the front end of the auxiliary arm 20 is engaged with the holding member 38 at the front end of the swing arm 3. Because the holding member 38 has the V-shaped groove as described above, the latch supporting member 23 is correctly guided to the center of the holding member 38 even when there is a gap between the height of the swing arm 3 and the height of the auxiliary arm 20. As a result, the positioning in the height direction is carried out correctly, and the swing arm 3 is supported correctly by the auxiliary arm 20.

Figure 8A:
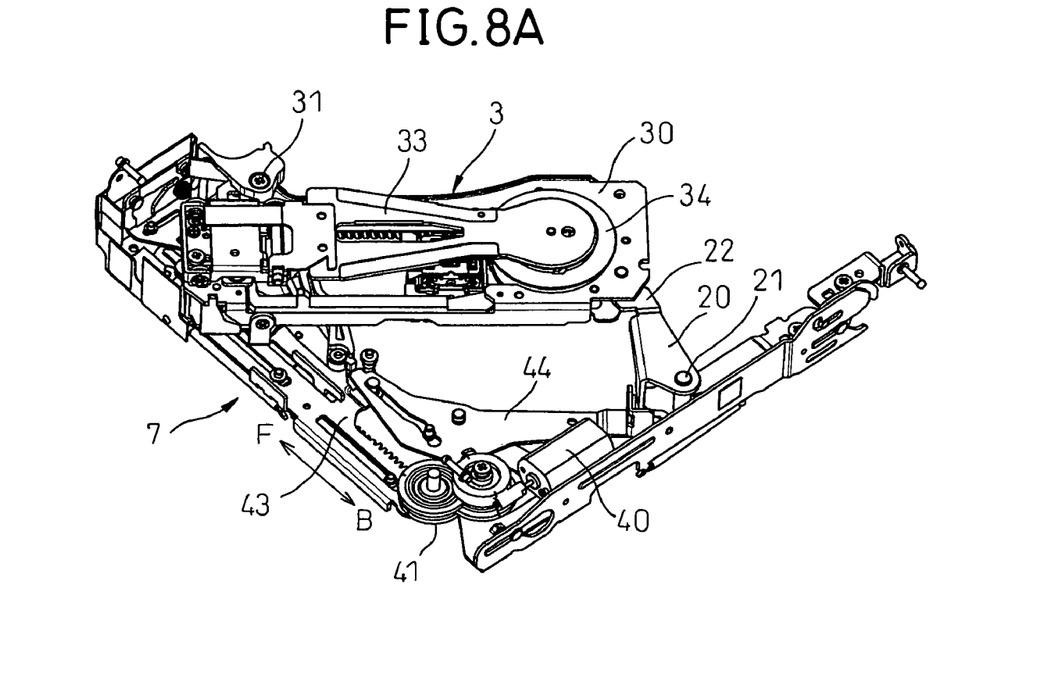
FIG. 8A is a perspective view of a detailed mechanism of a swing arm drive system showing a state that the swing arm is supported by the auxiliary arm at the content reproduction position.
Figure 8B:
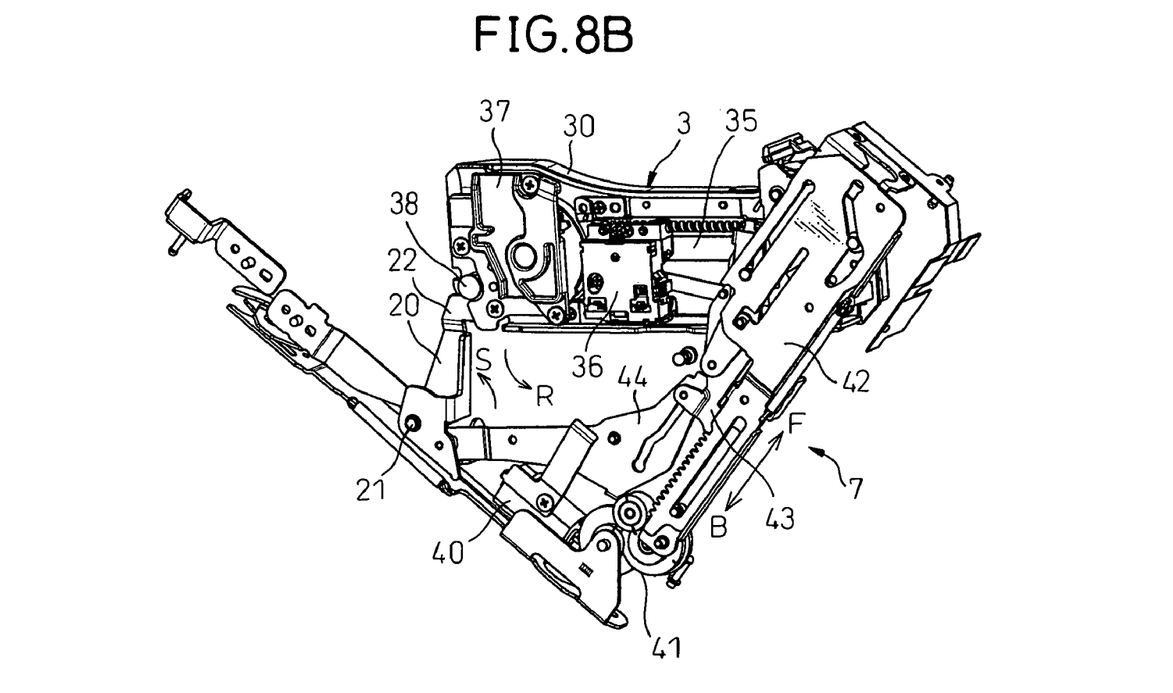
FIG. 8B is a perspective view of the mechanism of the swing arm drive system observed from the bottom surface of the swing arm shown in FIG. 8A.

FIG. 8A and FIG. 8B show a detailed mechanism of the swing arm drive system 7. FIG. 8A is a perspective view of the mechanism showing a state that the swing arm 3 is supported by the auxiliary arm 20 at the content reproduction position. FIG. 8B is a perspective view of the mechanism of the swing arm drive system 7 observed from the bottom surface of the swing arm 20 shown in FIG. 8A. The swing arm drive system 7 includes the motor 40, a gear box 41 having a combination of plural gears that decelerate the turning force of the motor 40, a swing arm drive plate 42 that operates the swing arm 3, a relay plate 43 that is connected to the swing arm drive plate 42, and an auxiliary arm drive plate 44 that is connected to the auxiliary arm 20 and operates the auxiliary arm 20 according to the operation of the relate plate 43.

When the motor 40 is rotated in the state shown in FIG. 4A, the turning force of the motor 40 is transmitted to the swing arm drive plate 42 shown in FIG. 8B via the gear box 41, and the swing arm drive plate 42 moves to a direction of an arrowhead F. Based on the move of the swing arm drive plate 42 to the direction of the arrowhead F, the swing arm 3 is rotated. When the swing arm drive plate 42 moves by a constant distance, the swing arm drive plate 42 engages the relay plate 43 with the gear box 41, and the relay plate 43 moves to the direction of the arrowhead F together with the swing arm drive plate 42.

When the motor 40 further rotates, the disc 2 is mounted on the turntable 32 shown in FIG. 6A of the swing arm 3, and is clamped by the clamper 34. Thereafter, the swing arm 3 is rotated to the direction of the arrowhead R as shown in FIG. 4B, and proceeds to the disc reproduction position. At this time, the auxiliary arm drive plate 44 operates, based on the move of the relay plate 43 together with the swing arm drive plate 42 in the direction of the arrowhead F. As a result, the auxiliary arm 20 is rotated in the direction of the arrowhead S indicated in FIG. 4B around the rotation axis 21.

Then, as explained with reference to FIG. 4B, the front end 22 of the auxiliary arm 20 first enters the moving track at the front end of the swing arm 3. When the swing arm 3 comes to the position of reproducing the content of the disc, the front end 22 of the auxiliary arm 20 is engaged with the holding member 38 at the front end of the swing arm 3, and supports the swing arm 3 as shown in FIG. 8A and FIG. 8B.

As explained above, when the swing arm 3 is clamping the disc, the auxiliary arm 20 does not operate. After the swing arm 3 has clamped the disc, when the swing arm 3 is rotated to the disc reproduction position, the auxiliary arm 20 supports the part of the swing arm 3 near the front end of the swing arm 3.

According to the disc reproducing device of the disc changer according to the present invention, the front end of the swing arm 3 is not fluctuated when the swing arm 3 reproduces the content of the disc 2. Consequently, data recorded on the disc 2 can be read correctly.

What is claimed is:

1. A disc changer for a disc drive unit, including a disc accommodation section that accommodates a plurality of discs, the disc changer comprising:
    a swing arm that has a turntable for rotating a disc, which is at a waiting position when the disc changer is not operating, is swung to a position of a center hole of the disc in the disc accommodation section at a time of taking out the disc, and is swung into a reproducing position located between the waiting position and the position of the center hole of the disc at a time of reproducing content of the disc; and
    an auxiliary arm that supports the swing arm by being swung from a waiting position to the reproducing position of the swing arm and being engaged with a front end of the swing arm, when the swing arm is swung to the reproducing position from the position of the center hole of the disc with the disc on the turntable at which the content of the disc is to be reproduced;
    wherein the auxiliary arm is swung and first enters a moving track of the front end of the swing arm when the swing arm returns to the disc content reproduction position by clamping a disc on the turntable, and is engaged with the swing arm in a direction to interrupt the swing operation of the swing arm when the swing arm has come to the disc reproducing position later.

2. The disc changer for a disc drive unit according to claim 1, wherein a pulley engagement projection having a V-shaped groove is provided on the lower surface of the front end of the swing arm, and an engagement recess that is engaged with the V-shaped groove of the engagement projection is provided at the front end of the auxiliary arm.

3. A disc changer for a disc drive unit, including a disc accommodation section that accommodates a plurality of discs and can be lifted up and moved down within the disc drive unit, and a disc reproducing device that takes out one of the discs accommodated in the disc accommodation section and reproduces the content of the disc, wherein the disc reproducing device comprises:
    a swing arm that has a turntable for rotating a disc which is at a waiting position when the disc changer is not operating, is swung into a position of a center hole of the disc in the disc accommodation section at a time of taking out the disc, and is swung to a reproducing position located between the waiting position and the position of the center hole of the disc at a time of reproducing the content of the disc, and an optical head that reads information recorded on the disc; and
an auxiliary arm that supports the swing arm by being swung from a waiting position to the reproducing position of the swing arm and being engaged with a front end of the swing arm, when the swing arm is swung to the reproducing position from the position of the center hole of the disc with the disc on the turntable at which the content of the disc is to be reproduced;
wherein a drive unit of the swing arm comprises:
    a relay plate to be connected to a drive plate of the swing arm; and
    a drive plate of the auxiliary arm that operates the auxiliary arm in response to the operation of the relay plate, and when the swing arm is swung to the disc content reproduction position after the swing arm has clamped a disc, the drive plate of the auxiliary plate operates to make the auxiliary arm support a part of the swing arm near the front end of the swing arm.

* * * * *